United States Patent [19]

Ito et al.

[11] Patent Number: 4,790,660
[45] Date of Patent: Dec. 13, 1988

[54] SHAPE MEASURING INSTRUMENT

[75] Inventors: Giichi Ito, Koganei; Kousaku Mukai, Tokyo; Yuichi Shimizu, Koganei; Saiju Suzuki, Chofu, all of Japan

[73] Assignee: NTT Technology Transfer Corporation, Tokyo, Japan

[21] Appl. No.: 101,455

[22] Filed: Sep. 28, 1987

[30] Foreign Application Priority Data

Oct. 3, 1986 [JP] Japan .............................. 61-234308
Mar. 3, 1987 [JP] Japan .............................. 62-46743

[51] Int. Cl.$^4$ ...................... G01B 11/06; G01B 11/02
[52] U.S. Cl. ......................................... 356/376; 356/1
[58] Field of Search ........................... 356/1, 375, 376

[56] References Cited

U.S. PATENT DOCUMENTS

| | | | |
|---|---|---|---|
| 4,343,553 | 8/1982 | Nakagawa et al. | 356/376 |
| 4,567,347 | 1/1986 | Ito et al. | 356/376 |
| 4,666,303 | 5/1987 | Pryor | 356/375 |

FOREIGN PATENT DOCUMENTS

| | | | |
|---|---|---|---|
| 61-611 | 4/1985 | Japan | 356/1 |
| 86/05268 | 9/1986 | PCT Int'l Appl. | 356/376 |

*Primary Examiner*—Richard A. Rosenberger
*Attorney, Agent, or Firm*—Pollock, Vande Sande and Priddy

[57] ABSTRACT

A flat light beam is projected from a light projecting unit to an object to be measured, sweeping its surface with a bright line. The image of the bright line is focused on pluralities of photosensor arrays and line photosensors. A plurality of positions in the bright line are computed by triangular surveying, based on the direction of projection of the flat signal light beam and the positions of those photosensors in each array from which the signal light component is obtained. The position of a gap in the surface of the object is computed, using the detected positions of the photosensors and a signal which indicates a dropout of the signal light component from the output of a line photosensor.

12 Claims, 10 Drawing Sheets

SHAPE MEASURING INSTRUMENT

BACKGROUND OF THE INVENTION

The automation of various processes in factories or the like calls for automatic recognition of shapes of objects which are handled in the processes. For example, in an assembly line in which parts are fed one after another the situation arises occasionally where it is necessary to sort them out while automatically recognizing their shapes. The present invention relates to a shape measuring instrument which permits fast automatic measurement of shapes of such objects, and hence is suitable for use in automatic measurement of parts in production-line and various other processing and as a visual sensor of a robot or the like.

Various methods have been proposed for detecting shapes of objects. A description will be given of some of them.

(1) Method using TV cameras

In the case of image sensing of the same object with two or three TV cameras, images created in focal planes of the respective cameras differ according to the direction in which the object is viewed and the distance between the object and the camera. This method senses the shape of an object by computer-processing such differences. With this method, the computer-processing time is appreciably long and the accuracy of measurement is low and is readily affected by the illumination of the object.

(2) Triangular surveying method using laser beam

This is proposed in U.S. Pat. No. 4,567,347 (issued on Jan. 28, 1986). According to this method, a laser beam is projected onto the surface of an object, a spot of light created thereon is picked up by a photosensing device, and the direction of light from the spot is detected based on the position of the image of the spot on the photosensing device. The position of the spot on the object surface is obtained from the detected direction of light and the direction of the laser beam through utilization of the triangular surveying technique, and then the shape of the object is decided using many such measured values. This method is now employed in a visual sensor of a welding robot and is convenient for detecting the shape of one cross section of an object, but takes much time for obtaining the shape of the whole object.

(3) Method using a flat light beam and a TV camera

A bright line of light, produced on the surface of an object by projecting thereto a flat light beam (fan beam or slit light beam), bends following the surface configuration of the object when the bright line is viewed from a direction oblique thereto. This method detects the shape of the object surface by image sensing of such a bright line of light. This method is now also applied to the visual sensor of a welding robot, but is low in the accuracy of measurement and is not suited to measuring the whole shape of an object.

As described above, various methods have been proposed, but each of them has the defect that the computer processing time is long, that the accuracy of measurement is low, or that the shape of an object can be measured roughly but a narrow gap cannot be detected. Moreover, the prior art methods all encounter difficulty in detecting the shape of an object of a given configuration and a gap defined by abutting edges of two objects and cannot simultaneously detect the shape of an object and a gap in its surface.

An object of the present invention is to provide a shape measuring instrument which enables the shape of an object to be measured in a short time and with a high degree of accuracy.

It is another object of the present invention to provide a shape measuring instrument which permits measurement of the shape of an object and a gap in its surface.

Yet another object of the present invention is to provide a shape measuring instrument which permits highly accurate and fast measurement of the shape of an object and a gap in its surface.

SUMMARY OF THE INVENTION

According to an aspect of the present invention, a light projecting unit and light receiving unit are mounted on a measuring head. The light projecting unit projects a flat signal light beam, which is oscillated to sweep, as a bright line, the surface of an object to be measured. The light receiving unit includes a photosensing device composed of a plurality of photosensor arrays, on which the bright line on the object surface is focused into an image by optical means. Output terminals of photosensors of each photosensor array are sequentially changed over by a switching circuit at a speed higher than the oscillation speed of the signal light beam, and the signal light component is detected by a detector from each output signal of the switching circuit. A signal representing the direction of projection of the signal light beam is produced. The position of the photosensor which has detected the signal light component is decided for each array. Then the position of a point in the bright line is obtained, by computing means, from the direction of projection of the signal light beam and the detected photosensor position in the array.

With such an arrangement, the positions of points in the bright line, which are equal in number to the number n of photosensor arrays, can be sensed at the same time. Accordingly, the shape of an object can be measured at a speed n times higher than in the case of the triangular surveying method in which a bright spot is produced on the surface of the object to be measured. Moreover, the accuracy of measurement can be increased by reducing the pitch of the photosensor arrays.

The shape measuring instrument of the present invention can also be arranged for simultaneously measuring the shape of an object and a gap in its surface. In this case, n line photosensors are disposed adjacent the n photosensor arrays in the light receiving unit, and the bright line is focused into an image on the n line photosensors as well. A dropout signal is generated which indicates disappearance of the signal light component from the output of each line photosensor. The position of the gap in the surface of the object is determined by the computing means based on the position of the gap in the bright line and the dropout signal.

According to another aspect of the present invention, a thin line beam (i.e. pencil beam) of signal light is used in place of the afore-mentioned flat signal light beam, and accordingly the surface of the object is swept by a bright spot. The light receiving unit employs a single photosensor array and a single line photosensor. The position of the bright spot on the object surface and the position of the gap are sensed using the outputs of the photosensor array and the line photosensor in the same manner as mentioned above.

In this way, the present invention permits simultaneous measurement of the shape of an object and a gap in its surface. By the above-said combination of the flat signal light beam and pluralities of photosensor arrays and line photosensors, the shape of an object and a gap in its surface can be measured at a higher speed and with a higher degree of accuracy.

DETAILED DESCRIPTION OF THE PREFERRED EMBODIMENTS

Figure 1:
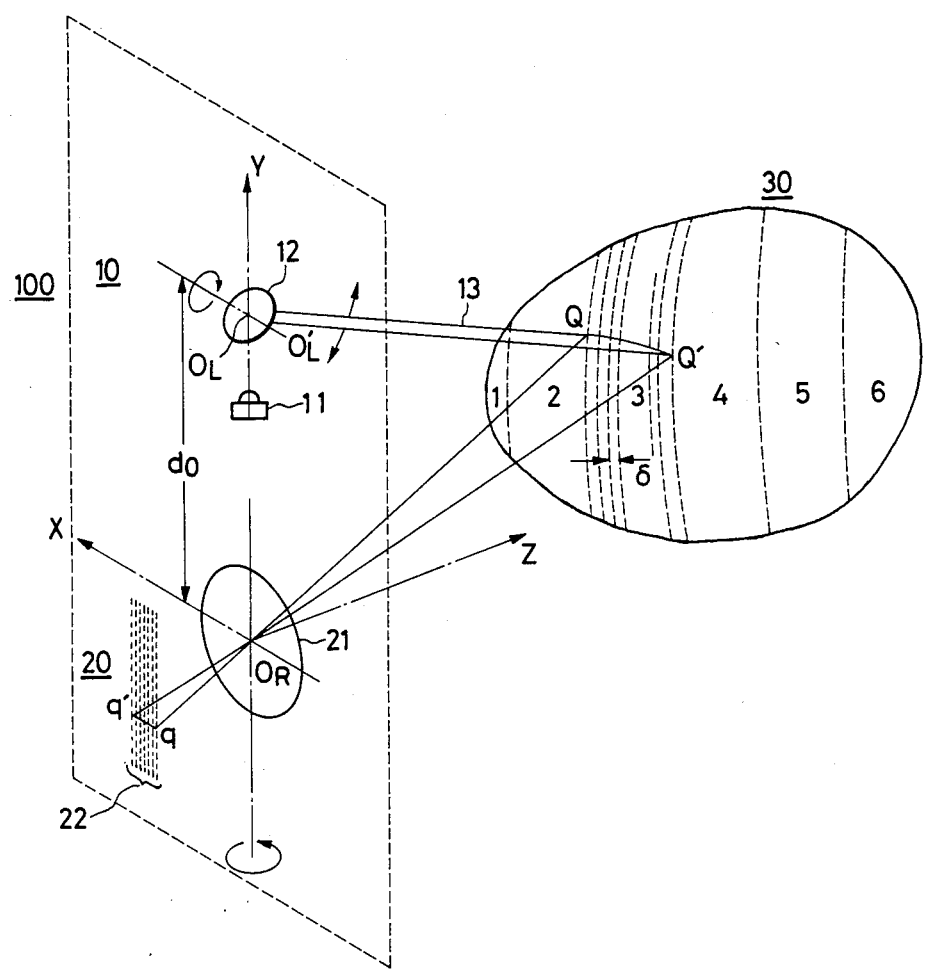
FIG. 1 is a diagram showing the outline of the constitution of the shape measuring instrument of the present invention.

FIG. 1 is a conceptual diagram showing the constitution of the measuring instrument of the present invention. Light projecting unit 10 and light receiving unit 20 are both mounted on a measuring head 100 of the measuring instrument. A fixed coordinate system XYZ is located on the measuring head 100.

The light projecting unit 10 comprises a signal light source 11 made up of a laser diode 14 and a cylindrical lens 15 (see FIG. 3) and an oscillating mirror 12. Signal light beam (which forms a thin flat light beam, or a fan beam) 13 emitted from the signal light source 11 is reflected by the oscillating mirror 12 onto an object to be measured 30 and sweeps (in the form of a bright line QQ') its surface by the oscillation of the mirror 12. The bright line is perpendicular to the direction of its sweep on the object 30. Let the center and the axis of rotation of the mirror 12 be represented by $O_L$ and $\overline{O_L O_L'}$, respectively. The signal light may preferably be laser light but ordinary light will do as well. Since the laser light is high-frequency modulated to avoid interference by noise as described later, it is desirable to remove the noise component by demodulating the laser light received by the light receiving unit 20.

Figure 2:
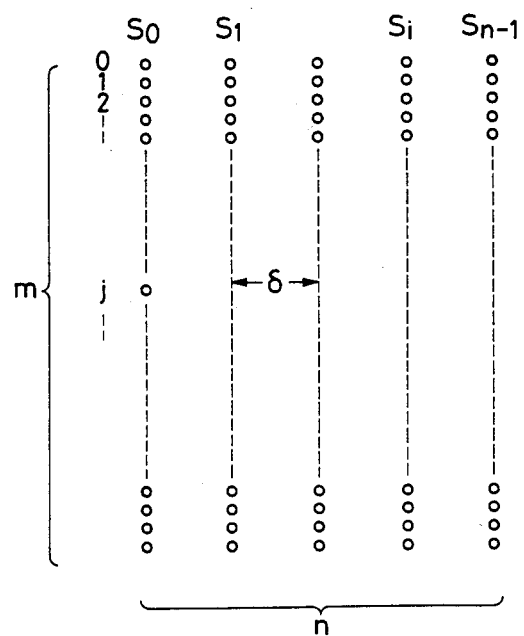
FIG. 2 is a diagram showing, by way of example, the arrangement of photosensor arrays of the light receiving unit.

The light receving unit 20 comprises a light receiving lens 21 and a multi-array photosensing device 22 which has a plurality of photosensor arrays ($S_0, S_1, \ldots S_{n-1}$), as depicted in FIG. 2. The light receiving unit 20 picks up, on its photosensor arrays, an image qq' of the bright line QQ' on the surface of the object 30 and produces outputs from the photosensors on which the image qq' is being projected. Now let the center of the light receiving lens 21 be represented by $O_R$. As the bright line QQ' sweeps the surface of the object 30 from top to bottom in FIG. 1, n trains of measured values are obtained corresponding to the photosensor arrays ($S_0, S_1, \ldots S_{n-1}$). When the pitch of the photosensor arrays is large, the pitch δ of simultaneous traces of measurement on the object 30 also increases. For smaller pitch of measurement, it is necessary only to rotate the whole body of the head 100 slightly with small step(s) about the Y axis. Also in the case where the total width of simultaneous sweep traces, (n−1)δ, of measurement is too small, the head 100 is similarly rotated about the Y axis.

Figure 3:
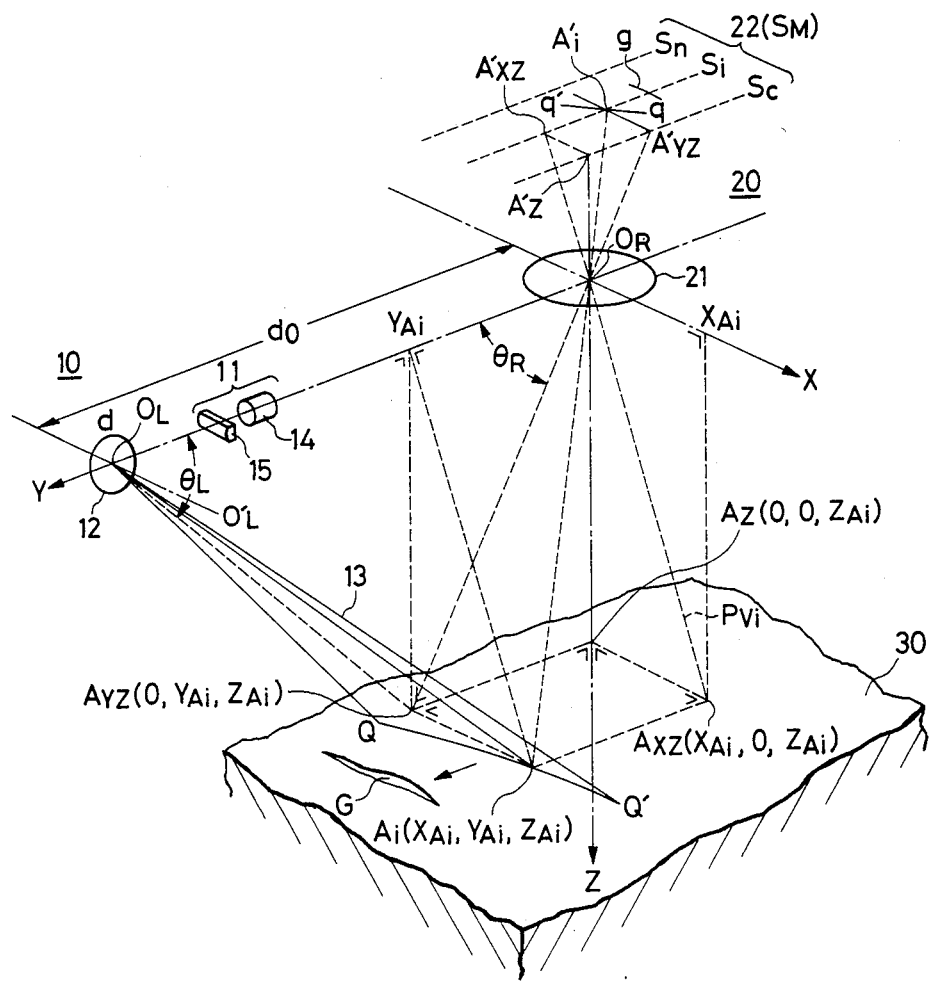
FIG. 3 is a diagram for explaining the principle of the present invention.

A description will be given, with reference to FIG. 3, of triangular surveying which is employed in measurement by the present invention. In FIG. 3 reference character $O_L$ indicates the center of the mirror 12, $O_R$ the center of the light receiving lens 21, $\overline{O_L O_R} = d_O$, and QQ' a bright line which the flat signal light beam 13 forms on the surface of the object 30. Assume that as the angle $\theta_L$ between the signal light beam 13 and the Y axis varies, the bright line QQ' sweeps the surface of the object 30. The image of the bright line QQ' is focused, by the lens 21, on the photosensor arrays 22, as indicated by qq'. Let it be assumed that a point $A_i$ on the bright line QQ' corresponds to a point $A_i'$ in the image qq' as shown. Consider that the center plane of the measuring head 100 is common to a plane passing through three points $O_L$, $A_{YZ}$ and $O_R$, the plane containing the Y axis, and the point $A_{YZ}$ being the foot of a perpendicular from the point $A_i$ to the Y-Z plane. Let the coordinates of the point $A_i$ be ($X_{Ai}, Y_{Ai}, Z_{Ai}$). The photosensor array $S_c$ lies in the Y-Z plane which is the center plane of the head 100 and the respective photosensor arrays $S_0, S_1, \ldots S_c, \ldots S_i, \ldots S_n$ lie in parallel to the Y axis and in a plane parallel to the X-Y plane and are substantially in agreement with a focal plane, that is, the plane on which the image of the object 30 is focused. Letting the foot of a perpendicular from the point $A_{YZ}$ to the Z axis be represented by $A_Z$ and the image of $A_Z$ on the photosensor array $S_c$ be represented by $A_{Z'}$, respectively, the distance $\overline{O_R A_{Z'}}$ is the structural constant of the measuring instrument. Let the angle between the Y axis of $\overline{O_R A_{YZ}}$ be represented by $\theta_R$. In this instance, the coordinate of the point $A_i$ is given by the following equation:

$$Y_{Ai} = \frac{d_O \tan\theta_L}{\tan\theta_L + \frac{O_R A'_Z}{A'_{XZ} A'_i}} \quad (1)$$

$$Z_{Ai} = \frac{O_R A'_Z}{A'_{XZ} A'_i} Y_{Ai}$$

$$X_{Ai} = \frac{A'_{XZ} A'_Z}{O_R A'_Z} Z_{Ai}$$

In the above $\theta_L$ is the angle of oscillation of the oscillating mirror 12 and is readable at any instant during the measurement, and distances $A_{Z'} A_{XZ'}$ and $A_{XZ'} A_i'$ can be obtained from the array number i to which the photosensor receiving the image at the point $A_i'$ and generating the corresponding output belongs and its sensor number in that array. Accordingly, the detection of the output from the photosensor at the point $A_i'$ will provide the position of the point $A_i$ from the above equation. Where the measuring head 100 is rotated, in its entirety, about the Y axis for measurement, the measured value can easily be converted to its original coordinate value through a coordinate transformation.

As shown in FIG. 1, the measuring instrument of the present invention sweeps the surface of the object 30 with the bright line QQ' resulting from the projection thereto of the flat signal light beam 13, employs a plurality n of photosensor arrays, and measures a plurality of points on the object 30 through utilization of the modified triangular surveying process. Accordingly, the invention reduces the time for measurement and ensures the same high precision measurement as can be done by ordinary triangular surveying.

Figure 4:
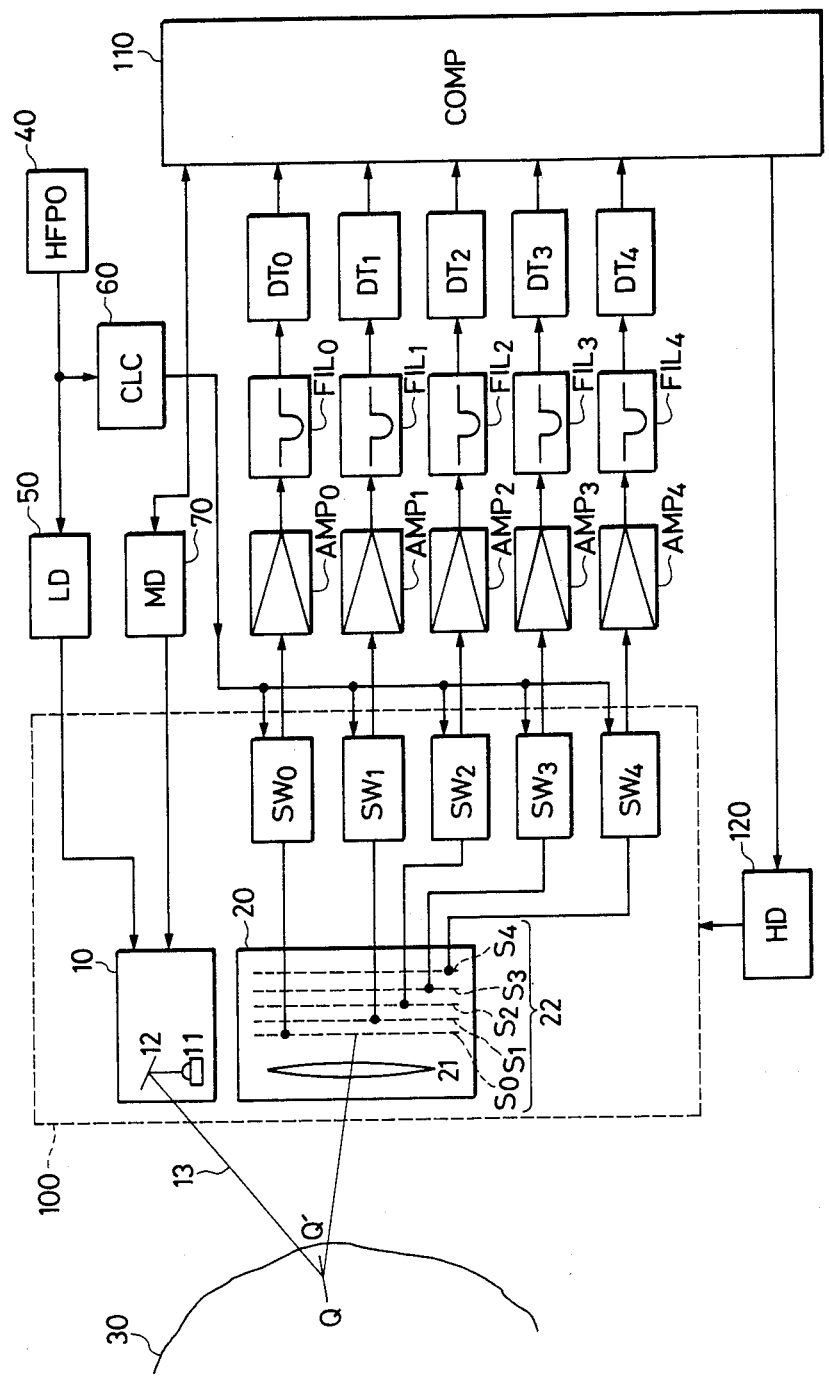
FIG. 4 is a block diagram illustrating an embodiment of the present invention.

FIG. 4 illustrates in block form an embodiment of the measuring instrument of the present invention. In FIG. 4 the output of a high-frequency pulse oscillator 40 is provided via laser diode driver 50 to the signal light source 11. At the same time the output of the high-frequency pulse oscillator 40 is applied to a clock counter 60, which in turn generates and applies signals of required frequencies to respective circuits of the measuring instrument. For example, the clock counter 60 supplies changeover switches $SW_0$ to $SW_4$ with switching signals and a mirror driver 70 with a signal which determines the oscillation cycle of the oscillating mirror 12. The output of the signal light source 11 is reflected by the oscillating mirror 12 to the object 30, and the flat signal light beam 13 sweeps its surface, that is, the bright line QQ' moves on the object surface. As shown in FIG. 3, the signal light source 11 comprises the laser diode 14, the output of which is shaped into a thin flat light beam, by the cylindrical lens 15 attached to the laser diode 14, and is projected onto the surface of the object 30, creating thereon the bright line QQ'.

The bright line QQ' on the surface of the object 30 is focused into an image on the photosensor arrays $S_0$ to $S_4$ through the light receiving lens 21, yielding an output from the photosensor at the position where the image is created. FIG. 4 shows the case where n=5, but the same operation as mentioned above takes place in the case of using a smaller or larger number of photosensor arrays. Respective output terminals of each photosensor array are switched by a high-speed electronic switch $SW_i$ (where i=1, 2, 3, 4), and its outputs are provided, as a serial signal, to a computer 110 via an amplifier $AMP_i$, filter $FIL_i$, and a detector $DT_i$. The detector $DET_i$ produces it output only when the image of the bright line QQ' passes on the photosensor corresponding to the signal output. The timing of the generation of the signal output from the detector $DET_i$, the timing of switching, and the position of the photosensor correspond to one another.

The pitch of the photosensor arrays $S_0$ to $S_4$ corresponds to the pitch of the simultaneous measurement traces in a sweep on the object 30. Where the total width $(n-1)\delta$ of the simultaneous measurement traces is desired to be large, it is possible to rotate the measuring head 100 about the Y axis, step by step, through angles corresponding to band-shape zones 1, 2, 3, 4, and 5 defined on the surface of the object 30 as shown in FIG. 1, for instance. Where the photosensor arrays cannot be arranged at a sufficiently small pitch, intermediate portions which would otherwise remain unmeasured can be measured by slightly rotating the measuring head 100 about the Y axis. Furthermore, measurement can be achieved by the combined use of the two methods, as required.

When the number of photosensors in each array $S_i$ is large, it may be difficult, with only one changeover switch $SW_i$, to switch all the photosensors in the array. In such an instance, the photosensors in each array $S_i$ are divided into a plurality of groups $S_{i1}$, $S_{i2}$, ... $S_{im}$, and a series of detection circuits including switch $SW_{ij}$, amplifier $AMP_{ij}$, filter $FIL_{ij}$ and detector $DT_{ij}$, may be provided for each group $S_{ij}$. The measuring head 100 is rotated about the Y axis by a head driver 120 under control of the computer 110.

The computer 110 receives the rotational angle $\theta_L$ of the oscillating mirror 12 and the output of the detector $DT_i$ (where i=0 to 4) and performs the calculation of Eq. (1), obtaining the shape of the object in terms of coordinates (X,Y,Z) of the measured points.

In the above case, since five series of measured values are obtained by a single sweep with the bright line, the measuring time is reduced to 1/5 of the case where a single measurement trace is obtained in each sweep. The laser light for measurement is modulated by the output of the high-frequency pulse oscillator 40 and is demodulated and detected after passing through the light receiving lens 21. Therefore, the laser light is substantially free from the influence of external noise light.

The photosensor arrays are each formed by arranging a number of photodiodes. Where the number of photosensors is so large that their electric wiring is difficult, they are fabricated as a single integrated circuit together with peripheral circuits. Alternatively, a number of optical fibers are arranged with one end disposed at required intervals and photodiodes are placed at the other ends for photoelectric conversion.

Figure 5:
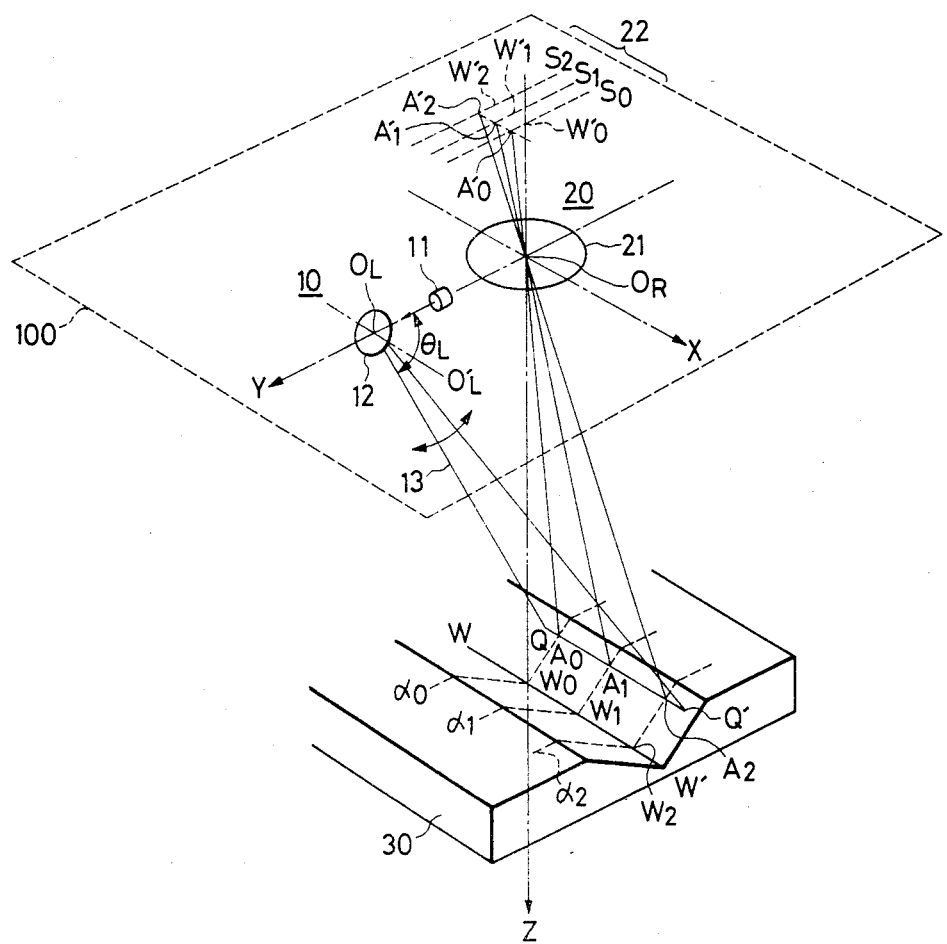
FIG. 5 is a diagram showing, by way of example, the application of the present invention to the measuring head of a visual sensor of a welding robot.

FIG. 5 illustrates an embodiment of the present invention as being applied to a visual sensor of a robot which is employed for arc welding or the like. In FIG. 5 the parts corresponding to those in the foregoing Figures are identified by the same reference numerals and characters. The flat light beam 13 is projected from the light projecting unit 10 onto the object 30, creating the bright line QQ'. The bright line QQ' sweeps the surface of the object 30 as the angle $\theta_L$ varies. The bright line QQ' is focused, by the lens 21 of the light receiving unit 20, into an image on the photosensor arrays ($S_0$, $S_1$, and $S_2$), and the photosensors on which the image lies yield their outputs, so that points $A_0$, $A_1$ and $A_2$ on the bright line QQ' corresponding to the photosensor arrays $S_0$, $S_1$ and $S_2$ are measured. As the angle $\theta_L$ varies, measurements along broken lines $\alpha_1$, $\alpha_2$ and $\alpha_3$ shown in FIG. 5 are achieved. Accordingly, a weld line WW' ($W_0$, $W_1$, $W_2$) can easily be obtained. Each of the positions of the points $W_0$, $W_1$ and $W_2$ is given as X, Y and Z coordinates. In the illustrated example an unshown welding torch is guided in a direction $W_0 \rightarrow W_1 \rightarrow W_2$. Since measured values concerning the surface of the object 30 are all provided in the fixed coordinate system with respect to the measuring head 100 and since the positional relationship between the measuring head 100 and the welding torch is preknown, the position and direction of the welding torch relative to the weld line can be obtained completely, permitting easy accurate welding work.

This embodiment shows the case where three photosensor arrays are employed. The following are the merits and demerits, in terms of control, depending on the number n of photosensor arrays used.

(1) Where n=1, only one point on the weld line WW' is measured by one sweep with the signal light beam. By repeating the sweep the positional and directional relationship between the weld line WW' and the measuring head 100 is obtained.

(2) Where n=2, two points on the weld line WW' are measured by one sweep, so that the positional and directional relationship between the weld line WW' and the measuring head 100 can be roughly obtained.

(3) Where n≧3, three points on the weld line WW' are measured, so that the positional and directional relationship between the weld line WW' and the measuring head 100 can be obtained substantially completely. Further, since the weld line can be detected in the form of a curved line, the movement of the welding torch along the weld line can be controlled with a high degree of accuracy. With an increase in the number of photosensor arrays used, the accuracy of the approximation to the curved weld line is increased correspondingly.

What is worthy of mention, here, is that the use of two or more photosensor arrays makes robot control far easier and far more accurate than in the case of employing only one photosensor array.

By forming the photosensor arrays $S_0$, $S_1$ and $S_3$ in FIG. 5 physically apart and making provision for mechanically adjusting their pitch from outside, the pitch of the lines $\alpha_1$, $\alpha_1$ and $\alpha_2$ on the object 30 corresponding to the photosensor arrays $S_0$, $S_1$ and $S_2$ can be changed. Accordingly, it is possible to perform measurement while changing the pitch of the points $W_0$, $W_1$ and $W_2$ on the weld line WW' in accordance with its curvature.

The pitch of the photosensor arrays $S_0$, $S_1$ and $S_2$ can be adjusted manually from outside or through an automatic adjustment mechanism. In the case of utilizing the automatic adjustment mechanism, the shape of the weld line obtained in the previous measurement can also be fed back to the mechanism. While the above has been described in connection with the case where three photosensor arrays are used, the same is true of the cases of employing two, four or more photosensor arrays as well.

As described above, according to the present invention, the shape of an object can be measured. Next, the present invention will be described in connection with the case of measuring the position of a gap in the surface of an object as well as the shape of the object itself.

As is well-known, when a light beam is projected onto the surface of an object, the surface causes diffused reflection and appears bright, but a gap in the surface absorbs the light to markedly reduce the reflected light and that part of the surface of the object appears dark. The shape measuring instrument of the present invention utilizes such characteristic, and its principle will hereinbelow be described.

Figure 6:
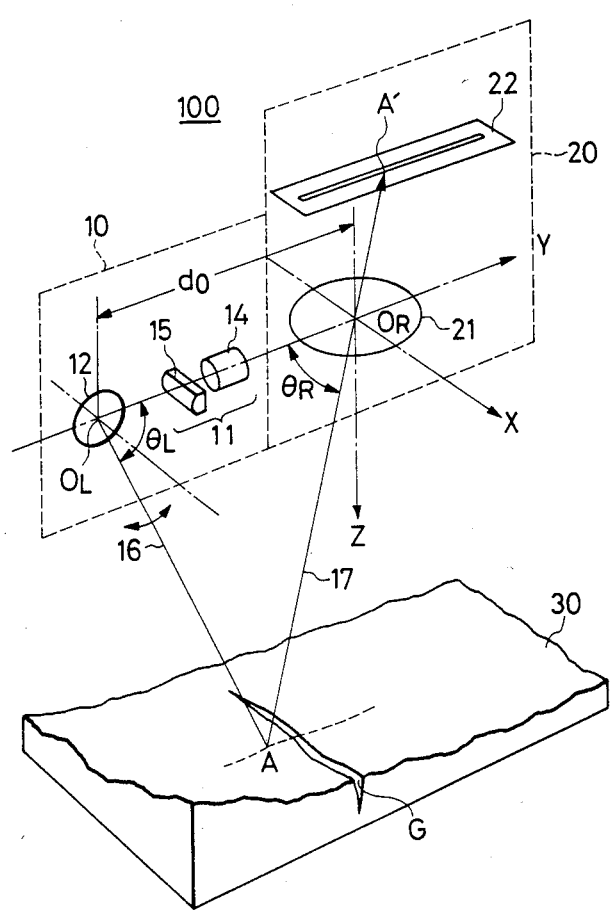
FIG. 6 is a diagram showing the principle of the shape measuring instrument for measuring the shape of the surface of an object and a gap therein through use of a signal light pencil beam.

(a) In the case of employing a single photosensor array and a line photosensor:

FIG. 6 shows the principle of the shape measuring instrument of the present invention which utilizes triangular surveying. The measuring head 100 comprises the light projecting unit 10 and the light receiving unit 20. The light projecting unit 10 projects a sharp linear signal light beam (i.e. a pencil beam) 16 from the signal light source 11 composed of a laser diode 14 and a condenser lens 15. The projected beam 16 is swung through the angle $\theta_L$ by the periodically oscillating mirror 12, scanning the surface of the object 30 with a bright spot A as indicated by the broken line.

The light receiving unit 20 comprises the lens 21 and the photosensing device 22 disposed in its focal plane, and is arranged so that the optical axis of the lens 21, the photosensing device 22, and the beam 16 always lie in the same plane. With such an arrangement, diffused reflected light from the bright spot A passes through the lens 21, creating an image A' on the photosensing device 22. In the following, a line 17 passing through the point A', the center $O_R$ of the lens 21, and the point A will be referred to as the viewing line of the light receiving unit 21, and the direction of the viewing line (the light receiving direction) will be expressed by the angle $\theta_R$ between a line passing the centers $O_L$ and $O_R$ of the mirror 12 and the lens 21 and the viewing line 17. As shown in FIG. 6, X, Y and Z coordinates are located with the origin at the center of the lens $O_R$, the Z axis along the optical axis of the lens 21, the Y axis along the line $O_R O_L$, and the X axis defined to provide a right-handed coordinate system. Since the distance $\overline{O_L O_R} = d_O$ between the light projecting unit 10 and the light receiving unit 20 is constant, if the angles $\theta_L$ and $\theta_R$ are known, then the coordinates of the bright spot A can be obtained from the following equations;

$$\left. \begin{array}{l} Z = \dfrac{d_O \tan\theta_L \tan\theta_R}{\tan\theta_L + \tan\theta_R} \\ Y = \dfrac{d_O \tan\theta_L}{\tan\theta_L + \tan\theta_R} \end{array} \right\} \quad (2)$$

Figure 7A:
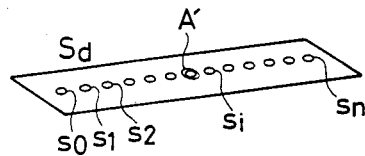
FIG. 7A is a diagram showing a photosensor array.
Figure 7B:
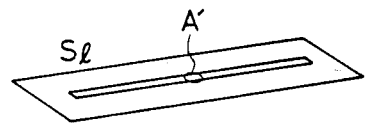
FIG. 7B is a diagram showing a line photosensor.
Figure 7C:
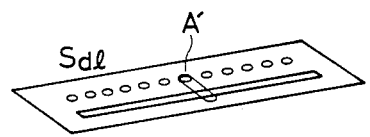
FIG. 7C is a diagram showing a composite photosensing device.

FIGS. 7A, 7B and 7C show, as examples of the photosensing device 22, a photosensor array $S_d$, a line photosensor $S_l$, and a composite device $S_{dl}$ which is a combination of the former two, respectively. Now, a description will be given of operations of the shape measuring instruments employing these photosensing devices, respectively.

The photosensor array $S_d$ depicted in FIG. 7A is made up of photosensors $s_O$ to $s_m$ arranged in a line at regular intervals, each photosensor having a very small light receiving face. Using the photosensor array $S_d$ as the photosensing device 22 in FIG. 6, it is possible to know whether a bright spot image A' focused on a photosensor $s_i$ contains the signal component. The direction of the viewing line, $\theta_R$, can be obtained from the position of the photosensor $s_i$, that is, its order number i. The position of the bright spot A can be obtained using the direction $\theta_R$ and the angle $\theta_L$. The bright spot moves continuously as the direction of the beam 16 varies, but each point of measurement can only be obtained discretely, corresponding to each photosensor $s_i$. When the bright spot A meets a gap G in the surface of the object 30, the diffused reflected light significantly decreases, resulting in the image A' disappearing. At this time, if the position of the gap G corresponds to the photosensor $s_i$, then no signal component is available from the output terminal of the photosensor $s_i$. If the position of the gap G correspond to the intermediate portion between two adjoining photosensors, however, the output of the light receiving unit 22 undergoes no change. Accordingly, the measurement of the gap G is very unreliable and can be regarded as almost impossible.

The line photosensor $S_l$ in FIG. 7B is a photosensing device which has a narrow linear light receiving face. When the bright spot image A' is somewhere on the photosensor $S_l$, the signal component is obtained from its output terminal, and when the image A' disappears, no signal component is available. Accordingly, by using the line photosensor $S_l$ as the photosensing device 22, it is possible to detect the time when the bright spot A meets the gap G, but the position of the spot (or direction $\theta_R$) cannot be detected.

Figure 8:
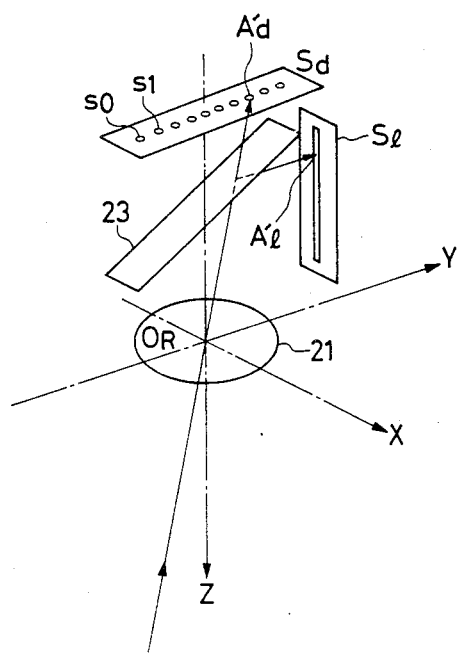
FIG. 8 is a diagram illustrating a photosensing device with a beam splitter.

In view of the above, the light receiving unit 20 is arranged as shown in FIG. 8, in which a beam splitter (a half mirror or birefringent prism( 23 is disposed behind the lens 21, by which the luminous flux is divided into two, one of which is applied to the photosensor array $S_d$ and the other of which is applied to the line photosensor $S_l$, forming thereon the bright spot images $A_d'$ and $A_l'$, respectively. With such an arrangement, the surface configuration of the object 30 is calculated by the triangular surveying method based on the direction $\theta_L$ of the beam and the signal output from the photosensor array $S_d$. Furthermore, by utilizing a dropout signal which indicates the disappearance of the signal component from the output of the line photosensor $S_l$, the position of the corresponding point on the photosensor array $S_d$ at the time of disappearance is obtained, on the basis of which the direction of the viewing line to the gap G is calculated, thus sensing the position of the gap G.

Where the gap G is relatively wide, it can be detected even if the bright spot A is large. Therefore, by employing a photosensing device $S_{dl}$ which is made up of a pair consisting of the photosensor array and the line photosensor disposed in parallel but spaced a little apart so that the bright spot image A' is formed somewhat slender, as shown in FIG. 7C, the shapes of the object 30 and the gap therein can be measured without using the beam splitter 23.

Figure 9A:
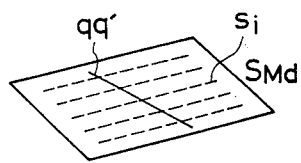
FIG. 9A is a diagram showing a photosensing device composed of a plurality of photosensor arrays.

(b) In the case of employing plural pairs of photosensor arrays and line photosensors:

Next, a description will be given, referring back to FIG. 3, of a shape measuring instrument which is a modification of the above-mentioned structure of the present invention. In FIG. 3 the thin flat beam 13 emitted from the signal light source 11 composed of the laser diode 14 and the cylindrical lens 15, is reflected by the oscillating mirror 12 onto the surface of the object 30 while being periodically swung through the angle $\theta_L$, scanning the surface of the object 30 with the bright line QQ'. The thin flat beam 13 contains an axis $O_L O_L'$ parallel to the X axis and oscillates angularly about this axis. By disposing a multi-array photosensing device $S_M$ in the focal plane of the light receiving unit 20, the image qq' of the bright line QQ' is focused on the photosensing device $S_M$, and the image qq' scans the photosensing device $S_M$ as the bright line QQ' moves. When, as shown in FIG. 9A, a multi-array photosensor $S_{Md}$, which is identical in structure with that shown in FIG. 2 and in which a plurality of photosensor arrays are arranged in the focal plane of the light receiving unit 20 at regular intervals and in parallel as shown in FIG. 9A, is disposed, as the multi-array photosensing device $S_M$, in parallel to the Y axis, the plane passing through each photosensor array $S_i$ and the center of the lens 21 contains many viewing lines. This plane will hereinafter be referred to as a viewing plane $P_{Vi}$. With such an arrangement, as the flat beam 13 oscillates, the light receiving unit 20 scans along lines of intersection between a plurality of planes $P_{Vi}$ and the surface of the object 30.

Assuming that the point $A_i$ on the bright line QQ' is being focused into the image $A_1'$ on the photosensor $s_i$ of the photosensor array, the coordinates of the point $A_i$ can be calculated from the aforementioned Eq. (1).

In Eq. (1) $O_R A_{Z'}$ is the structural constant which is dependent upon the structure of the light receiving unit 20, as mentioned previously. $A_{Z'} A_{XZ}$ and $A_{XZ'} A_i'$ can be obtained by detecting the position of the photosensor having output the signal component. Accordingly, the coordinates of the point $A_i$ on the bright line QQ' can be obtained using the direction $\theta_L$ of the thin flat beam 13, the distance $d_O$ between the light projecting unit 10 and the light receiving unit 20, the structural constant $O_R A_{Z'}$ of the light receiving unit 20, and the position $A_i'$ of the photosensor having output the signal component.

Figure 9B:
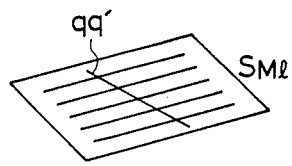
FIG. 9B is a diagram showing a photosensing device composed of a plurality of line photosensors.

Next, a description will be given of the case where a multi-array line photosensor $S_{Ml}$ depicted in FIG. 9B is employed in place of the multi-array photosensor $S_{Md}$ described previously in connection with FIG. 9A. In the focal plane of the light receiving unit 20 there are a plurality (0, 1, 2, ... j, ... n) of line photosensors, the bright line image qq', and the image of the surface of the object 30. When the gap G exists in the surface of the object 30, its image g lies on the multi-array photosensor $S_{Ml}$. As the bright line QQ' scans the surface of the object 30, the bright line image qq' scans the focal plane, and when the bright line image qq' passes through the intersection of the line photosensor $S_{lj}$ and the image g of the gap G, the signal output from the line photosensor $S_{lj}$ disappears, by which it is possible to generate a dropout signal for use as a timing signal.

Figure 10:
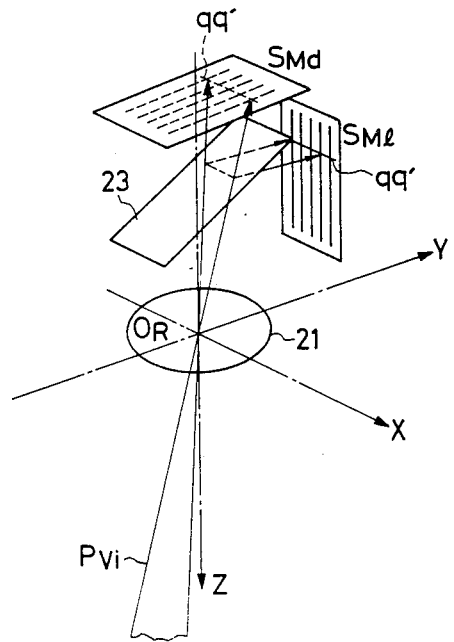
FIG. 10 is a diagram illustrating a multi-type photosensing device with a beam splitter.

In the case where the light receiving unit 20 is made up of the lens 21, the beam splitter 23, the multi-array photosensor $S_{Md}$, and the multi-array line-photosensor $S_{Ml}$ as shown in FIG. 10 and the positional correspondence between the respective photosensors is held correctly, the same number of series of measured values as the number of pairs of the photosensor arrays and the line photosensors can be obtained upon each sweep of the surface of the object 30 with the bright line QQ'. In this instance, the position of the gap G in the surface of the object 30 can be calculated in the same manner as described previously.

Figure 9C:
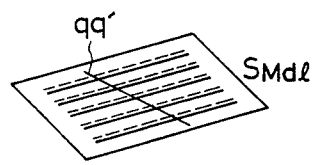
FIG. 9C is a diagram showing a photosensing device composed of a plurality of pairs of photosensor arrays and line photosensors.

By employing, as the photosensing device 22 in FIG. 3, a multi-composite photosensing device $S_{Ml}$ (FIG. 9C) which is formed by a number of pairs of photosensor arrays and line photosensors as depicted in FIG. 7C, it is possible to perform, without using the beam splitter 23, the same measurement as mentioned above.

(c) Effect by the number of pairs of photosensor arrays and line photosensors

With a shape measuring instrument employing a single pair consisting of a photosensor array and line photosensor, the shape of one section of the object is obtained for each sweep with the laser beam 13. On the other hand, when a plurality of pairs of photosensor arrays and line photosensors are used, shapes of sections of the same number as the number n of such pairs are obtainable for each sweep with the thin flat beam 13.

In the case of employing the shape measuring instrument of the present invention as a visual sensor of a welding robot, for instance, when a single pair consisting of a photosensor array and line photosensor is used, that is, when n=1, only one working point of the robot can be obtained for each sweep with the signal beam. Accordingly, it is difficult to detect the direction of working line. As the number n of pairs increases to 2, 3, . . . , the direction and curve of the working line can be detected more and more in detail, enabling the robot to be controlled at higher speed and with higher accuracy. With an increase in the number n, however, the measuring head and the measurement controller becomes inevitably more bulky and heavier. In actual designing of the measuring instrument, the number n is selected within the range of value which satisfies requirements in practical use.

Figure 11:
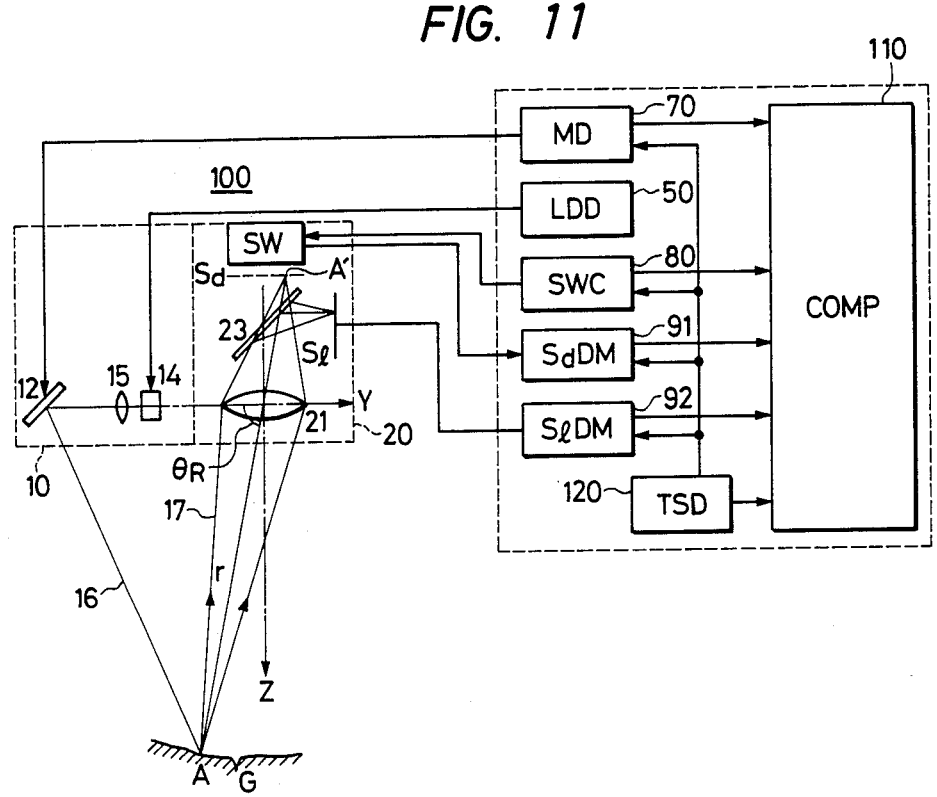
FIG. 11 is a block diagram illustrating an embodiment of the measuring instrument of the present invention which detects the shape of the surface of an object and a gap therein.

Next, a description will be given, with reference to FIG. 11, of an embodiment of the present invention which employs the light receiving unit 20 depicted in FIG. 8. In FIG. 11 the parts corresponding to those in the above are identified by the same reference numerals and characters unless otherwise specified. A mirror driver 70 applies a drive current to the mirror 12 for its angular oscillation and supplies the computer 110 with a signal representing the rotational angle $\theta_L$. A laser diode driver 50 applies a high-frequency modulated drive current to the laser diode 14. A high-speed electronic switch control circuit 80 provides a control signal to the high-speed electronic switch SW and, at the same time, applies switching information to the computer 110. A signal detector 91 demodulates and detects a serial signal train obtained by switching output terminals of the photosensor array $S_d$ with the high-speed electronic switch SW, and detects and applies the signal component to the computer 110. A gap signal detector 92 demodulates and detects the output from the line photosensor $S_l$ and, in the case of no signal component being detected, applies a dropout signal to the computer 110. A timing signal generator 120 generates timing signals necessary for the whole measurement controller to operate systmatically and provides them to respective circuits. The computer 110 receives various signals from the respective circuits (70, 80, 91, 92 and 120) and computes the coordinates of the bright spot A and the gap G. The computer 110 performs the computations in succession in response to the changes in the direction of the beam 13, obtaining the sectional shape of the object 30.

Figure 12:
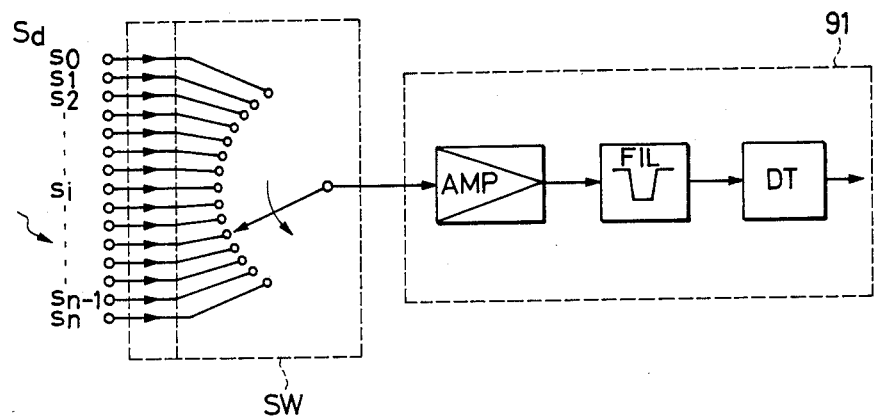
FIG. 12 is a diagram showing a high-speed electronic switch and a signal detector.

The operation of the signal detector 91 will be described with regard to FIG. 12. The angular oscillation period $\tau_L$ of the beam 13 is equal to the period of scanning of the photosensor array $S_d$ by the bright spot image A' and is relatively long. Accordingly, by selecting the scanning peiod $\tau_{SW}$ of output terminals of the photosensor array $S_d$ by the high-speed electronic switch SW, sufficiently shorter than the period $\tau_L$, it is possible to scan all the output terminals of the photosensor array and pick up the signal component for input to the succeeding circuit. The output from the high-speed electronic switch SW is demodulated by the passage through an amplifier AMP, a filter FIL, and a detector DT. A maximum value of the signal component in one cycle of the angular oscillation of the beam 13 is used as the signal output, i.e. the output corresponding to the bright spot image A'. The viewing-line direction $\theta_R$ is obtained based on the order number of the photosensor that provided the above output.

Figure 13A:
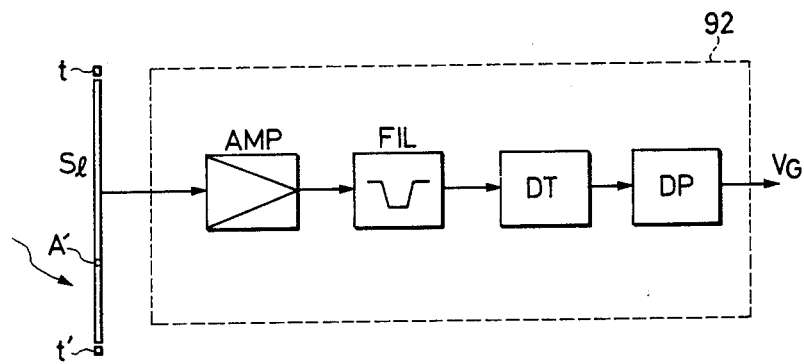
FIG. 13A is a diagram showing a line photosensor and its signal detector.
Figure 13B:
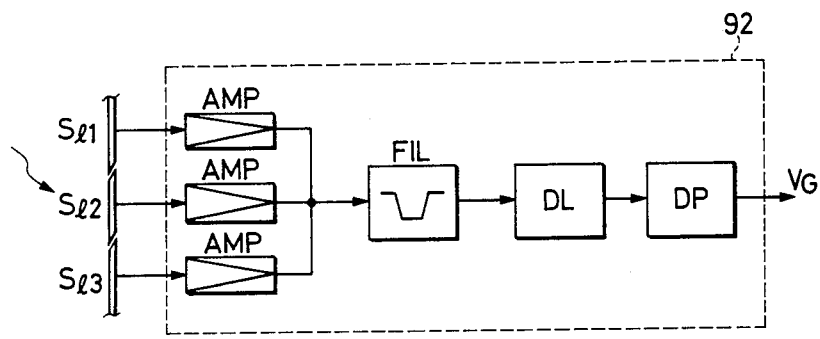
FIG. 13B is a diagram showing a divided-type line photosensor and its signal detector.

FIGS. 13A and 13B show the gap signal detector 92. FIG. 13A shows the case where one line photosensor $S_l$ is used. As long as the bright spot A exists on the surface of the object 30, the line photosensor $S_l$ keeps on outputting the signal component. When the beam 13 enters the gap G in the surface of the object 30, the bright spot A disappears and its image A' also disappears from the surface of the line photosensor $S_l$, so that the signal output is no longer derived at its output terminal. As depicted in FIG. 13A, the output of the line photosensor $S_l$ is amplified by the amplifier AMP; the amplified output is applied to the filter FIL to pick up the signal component; the signal component is detected by the detector DT; and the detected output is applied to a dip detector DP, which yields a pulse corresponding to the dropout of the beam. Since this pulse indicates the absence of the signal component, a dropout signal $V_G$ representing the disappearance of the signal component is obtained when the beam 16 enters the gap G.

The line photosensor $S_l$ needs to have a short response time as well to the high-frequency modulated light, but as the line photosensor $S_l$ becomes longer, its response to the high-frequency modulated light becomes poorer. In the case where it is necessary to employ a long line photosensor, the photosensor may be divided into a suitable number of segments having tapered ends which are arranged such that adjacent segments laterally overlap at their tapered ends, and the outputs of the respective photosensor segments are connected in parallel via amplifiers AMP connected thereto individually, as shown in FIG. 13B. With such an arrangement, it is possible to prevent the signal component from disappearing at the gaps between the photosensor segments and improve the response to the high-frequency modulated light. Furthermore, a dot photosensor may be disposed at either end of the line photosensor so that its signal component output is detected for use as a timing signal for scanning. FIG. 13A shows an example in which dot photosensors t and t' are disposed at both ends of the line photosensor $S_l$.

The signal output of the line photosensor $S_l$ varies dependent upon the state of the surface of the object 30. For example, when the beam 16 is incident to a small pit or the like in the surface of the object 30, diffused reflection therefrom significantly decreases. By repeatedly scanning the surface of the object 30 with the beam 16 while moving the measuring head 100, it will be found that the decrease in the signal output of the line photosensor $S_l$ due to a flaw in the surface of the object 30 occurs almost at random and that the decrease in the output by a gap formed between two abutted objects occurs regularly along the gap. Measurement errors can be removed by statistically processing the measured results.

The shape measuring instrument of the present invention is intended primarily for use in a robot or machine tool, with the measuring head mounted thereon. Where the signl light beam from the measuring head is an invisible ray of light, it is often difficult for an operator to make sure of whether the plane of the measuring head 100 correctly faces the point of measurement. It is convenient, as a solution to this problem, to provide in the measuring head 100 a means for emitting a visible ray of light right ahead of it, in addition to the signal light.

By employing, as the photosensing device 22 in the device of FIG. 6 the composite photosensing device $S_{dl}$ of FIG. 7C and by rendering the bright spot A somewhat elongated so that its image A' may extend across the photosensor array and the line photosensor of the composite photosensing device $S_{dl}$, the shape of the object surface and a gap therein can be measured at the same time without using the beam splitter. No description will be repeated on the basic principle of measurement and the system configuration of the measuring instrument because they are the same as those in the embodiment described previously in respect of FIG. 11. In this instance, however, since the bright spot A is elongated, the measurable gap width is larger than in the embodiment of FIG. 11.

When using the light projecting unit 10 shown in FIG. 3 and the light receiving unit 20 in FIG. 10, a plurality of lines indicating sectional shapes of the object can be obtained upon each sweep of the object surface by the signal light beam 13. Where the shape measuring instrument is used as a visual sensor of a welding robot, for instance, a work line on the object can be obtained by a single sweep thereacross. The circuits for demodulation, signal detection, etc. on the output side of the light receiving unit 20 are the same as those employed in the example depicted in FIG. 11. Moreover, the beam splitter 23 can be omitted when using the composite photosensing device shown in FIG. 9C.

As described above, according to the present invention, the light projecting unit emits a signal light beam and sweeps the surface of an object with the light beam while oscillating it, and the light receiving unit focuses a bright line on the object surface into an image of the bright line on a plurality of photosensor arrays. The shape of the object surface can be obtained, as its coordinate values, by processing with a computer based on the positions of the photosensors which generated outputs corresponding to the signal light beam and the angular directions of the signal light beam. Furthermore, the time for measurement can be reduced. With a method which employs a TV camera and the image processing technique, now under study, it is difficult to accurately detect the shape of a gently curved face; however, the measuring instrument of the present invention permits easy detection of such a curved face.

The above-mentioned method which uses a TV camera and the image processing technique, in combination, poses a problem in the illumination of an object to be measured and encounters difficulty in measurement in the presence of noise light. According to the present invention, however, the influence of noise light can be eliminated and measurement can be achieved regardless of external illumination.

A robot visual sensor embodying the present invention produces a striking effect in the guide and control of the robot.

Moreover, according to the present invention, the surface of an object is swept by a sharp beam or thin flat beam, which is high-frequency modulated for avoiding the influence of external noise light, and the movement of a bright spot or line created by the beam on the object surface is picked up by light receiving unit. The light receiving unit is provided with one or more pairs of photosensor arrays and line photosensors. The shape of the object surface, the position of a gap in the object surface, the direction of a work line, and so forth can be measured with a high degree of accuracy, based on the outputs from the photosensor arrays and line photosensors, and the measurement is free from the influence of external noise light. Accordingly, the present invention is of great utility when employed in the visual sensor for robots which are used for the automation of arc welding, laser welding, ion beam welding, etc.

It will be apparent that many modifications and variations may be effected without departing from the scope of the novel concepts of the present invention.

What is claimed is:

1. A shape measuring instrument comprising:
   a measuring head;
   a light projecting unit mounted on the measuring head, for projecting a flat signal light beam and oscillating it to sweep the surface of an object with a bright line;
   a light receiving unit mounted on the measuring head for focusing the bright light on the object surface into an image on a plurality of photosensor arrays by optical means;
   switching circuits each provided for each of the photosensor arrays, for sequentially switching output terminals of photosensors of each photosensor array at a speed higher than the oscillation speed of the signal light beam and picking up their outputs;
   detecting means operatively connected to each of the switching circuits, for detecting the signal light component from each output of the switching circuit;
   means for generating a signal indicating the direction of projection of the signal light beam;
   deciding means for deciding, for each array, the position of a photosensor from which the signal component has been detected; and
   computing means for computing the positions of a plurality of points in the bright line, based on the decided photosensors in the photosensor arrays and the direction of projection of the oscillating signal light beam;
   said light receiving unit including line photosensors of the same number as the photosensor arrays, the bright line being focused by said optical means into an image on the line photosensors, a dropout signal being generated which indicates the disappearance of the signal component from the output of each line photosensor, and said computing means including means for calculating the position of a gap in the surface of the object, using the detected positions of the photosensors and the dropout signal.

2. The shape measuring instrument of claim 1, wherein the optical means is a light receiving lens, the axis of oscillation of the flat signal light beam is in a plane parallel to the center plane of the light receiving lens, the axis of oscillation is perpendicular to a connecting line between the center of oscillation $O_L$ and the center $O_R$ of the light receiving lens, the plurality of photosensor arrays are in a plane parallel to the light receiving lens, and the direction of arrangement of the photosensors of the photosensor arrays is parallel to the said connecting line.

3. The shape measuring instrument of claim 2, wherein letting the center $O_R$ of the light receiving lens be the origin, the connecting line be the Y axis, a line parallel to the axis of oscillation of the flat light beam and passing through the origin $O_R$ be the X axis, and an axis perpendicularly intersecting the X and Y axes be the Z axis, and letting the distance between the origin $O_R$ and the center of oscillation $O_L$ of the flat signal light beam be represented by $d_O$, the angle between the Y axis and the flat signal light beam represented by $\theta_L$, a point in a bright line QQ' be represented by $A_i$, the foot of a perpendicular from the point $A_i$ to the X-Z plane be represented by $A_{XZ}$, images of the points $A_i$ and $A_{XZ}$ on each photosensor array be represented by $A_i'$ and $A_{XZ}'$, and the intersection of the photosensor array and the Z axis be represented by $A_Z'$, the coordinates $X_{Ai}$, $Y_{Ai}$ and $Z_{Ai}$ of the point $A_i$ are obtained through computation by the computing means based on the following:

$$Y_{Ai} = \frac{d_O \tan\theta_L}{\tan\theta_L + \frac{O_R A'_Z}{A'_{XZ} A'_i}}$$

$$Z_{Ai} = \frac{O_R A'_Z}{A'_{XZ} A'_i} Y_{Ai}$$

$$X_{Ai} = \frac{A'_Z A'_{XZ}}{O_R A'_Z} Z_{Ai}.$$

4. The shape measuring instrument of claim 1, wherein the flat signal light beam is reflected by the surface of the object to the light receiving unit, and the reflected light is divided by the optical means into two, one focusing an image of the bright line on the photosensor arrays and the other focusing another image of the bright line on the line photosensors.

5. The shape measuring instrument of claim 1, wherein the photosensor arrays and the line photosensors are disposed in parallel and adjacent relation, forming a composite photosensing device.

6. The shape measuring instrument of claim 1, comprising modulating means by which the flat signal light beam to be projected is subjected to high-frequency pulse modulation, and demodulating means for demodulating each output of the switching circuit and applying the demodulated output as the signal component to the detecting means.

7. The shape measuring instrument of claim 1, wherein the line photosensors are each formed by a parallel connection of a plurality of line photosensor segments arranged lengthwise thereof.

8. A shape measuring instrument comprising:

a measuring head;
a light projecting unit mounted on the measuring head, for projecting a signal light beam and oscillating it to sweep the surface of an object with a bright spot;
a light receiving unit mounted on the measuring head, for focusing the bright spot, by optical means, into an image on a photosensor array and a line photosensor;
deciding means for deciding the position of a photosensor in said array from which the signal light component has been detected;
means for generating a dropout signal indicating disappearance of the signal component from the output of the line photosensor;
means for generating a signal indicating the direction of projection of the signal light beam; and
computing means for computing the position of the bright spot on the surface of the object, based on the signal indicating the direction of projection of the signal light beam and the decided photosensor position in the photosensor array, and computing the position of a gap in the object surface, using the computed position of the bright spot and the dropout signal.

9. The shape measuring instrument of claim 8, wherein the signal light is reflected by the surface of the object to the light receiving unit, and the reflected light is divided by the optical means into two, one focusing an image of the bright spot on the photosensor array and the other focusing another image of the bright spot on the line photosensor.

10. The shape measuring instrument of claim 8, wherein the photosensor array and the line photosensor are disposed in parallel and adjacent relation, forming a composite photosensing device.

11. The shape measuring instrument of claim 8, comprising modulating means by which the signal light beam to be projected is subjected to high-frequency pulse modulation, and demodulating means for demodulating the output of each of the photosensor array and the line photosensor, thereby detecting the signal component.

12. The shape measuring instrument of claim 8, wherein the line photosensor is formed by a parallel connection of a plurality of line photosensor segments arranged lengthwise thereof.

* * * * *